US009246764B2

(12) United States Patent
Sporel et al.

(10) Patent No.: US 9,246,764 B2
(45) Date of Patent: Jan. 26, 2016

(54) NETWORK SERVICE ADMISSION CONTROL USING DYNAMIC NETWORK TOPOLOGY AND CAPACITY UPDATES

(75) Inventors: Eric R. Sporel, Westford, MA (US); Sanjay K. Udani, Arlington, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 829 days.

(21) Appl. No.: 12/967,201

(22) Filed: Dec. 14, 2010

(65) Prior Publication Data
US 2012/0151056 A1 Jun. 14, 2012

(51) Int. Cl.
*H04L 12/24* (2006.01)
*H04L 12/751* (2013.01)

(52) U.S. Cl.
CPC ............ *H04L 41/0896* (2013.01); *H04L 45/02* (2013.01)

(58) Field of Classification Search
None
See application file for complete search history.

(56) References Cited

U.S. PATENT DOCUMENTS

| | | | | |
|---|---|---|---|---|
| 5,557,747 A * | 9/1996 | Rogers | ................. | H04L 41/16 709/223 |
| 6,128,649 A * | 10/2000 | Smith | ................. | H04N 7/152 348/14.03 |
| 6,219,786 B1 * | 4/2001 | Cunningham | ...... | H04L 12/2602 709/229 |
| 6,751,659 B1 * | 6/2004 | Fenger | ................. | H04L 29/06 709/221 |
| 7,649,890 B2 * | 1/2010 | Mizutani | ............ | H04L 12/5695 370/395.21 |
| 7,835,348 B2 * | 11/2010 | Kasralikar | ......... | H04L 63/1408 370/360 |
| 7,917,947 B2 * | 3/2011 | Yang | ................. | 726/15 |
| 7,929,550 B2 * | 4/2011 | Namihira et al. | ............ | 370/401 |
| 8,108,520 B2 * | 1/2012 | Ruutu | ................. | H04L 12/5695 370/395.21 |
| 8,130,713 B2 * | 3/2012 | Beiroumi | ............. | H04L 47/527 370/329 |
| 8,224,971 B1 * | 7/2012 | Miller et al. | ................. | 709/227 |
| 8,724,456 B1 * | 5/2014 | Hong | .................. | G06F 11/00 370/225 |
| 2001/0042139 A1 * | 11/2001 | Jeffords | ............... | G06F 9/5016 719/316 |
| 2004/0215817 A1 * | 10/2004 | Qing | .................. | H04L 45/00 709/238 |
| 2005/0018647 A1 * | 1/2005 | Lebrun et al. | ................. | 370/351 |
| 2005/0021752 A1 * | 1/2005 | Marimuthu | ....... | G06F 17/30982 709/225 |
| 2005/0039213 A1 * | 2/2005 | Matarese et al. | ................. | 725/95 |
| 2005/0071457 A1 * | 3/2005 | Yang-Huffman | ... | H04L 41/0893 709/224 |
| 2005/0105475 A1 * | 5/2005 | Norrgard et al. | ............. | 370/254 |
| 2005/0220019 A1 * | 10/2005 | Melpignano | ...... | H04W 72/1226 370/232 |
| 2005/0254426 A1 * | 11/2005 | Simonis | ........................ | 370/235 |
| 2006/0007858 A1 * | 1/2006 | Fingerhut et al. | ............ | 370/229 |
| 2006/0007936 A1 * | 1/2006 | Shrum, Jr. | ........... | H04L 12/5695 370/395.21 |
| 2006/0129670 A1 * | 6/2006 | Mayer | ........................ | 709/223 |
| 2006/0233101 A1 * | 10/2006 | Luft | ........................ | H04L 47/20 370/229 |
| 2006/0250948 A1 * | 11/2006 | Zamfir | .................... | H04L 45/02 370/216 |
| 2007/0024706 A1 * | 2/2007 | Brannon, Jr. | ........ | H04N 7/17318 348/142 |

(Continued)

*Primary Examiner* — Backhean Tiv

(57) ABSTRACT

A network device implements resource admission policy management related to controlling the denial or grant of a delivery of a network service to a customer device. The network device receives a notification related to a change in network topology or network capacity of a network that delivers the network service. The network device identifies changes in the network topology or the network capacity based on the notification, and applies resource admission control to deny or grant the customer device access, to resources of the network to receive delivery of the network service, based on the identified changes in the network topology and/or the network capacity.

19 Claims, 7 Drawing Sheets

(56) References Cited

U.S. PATENT DOCUMENTS

| | | | | |
|---|---|---|---|---|
| 2007/0206552 | A1* | 9/2007 | Yaqub | H04W 28/24 370/338 |
| 2007/0280232 | A1* | 12/2007 | Dec | H04L 12/18 370/390 |
| 2008/0049648 | A1* | 2/2008 | Liu | H04L 65/80 370/310 |
| 2008/0160958 | A1* | 7/2008 | Abichandani | H04M 1/72563 455/410 |
| 2008/0163333 | A1* | 7/2008 | Kasralikar | H04L 63/1408 726/1 |
| 2008/0181117 | A1* | 7/2008 | Acke | H04L 67/125 370/236.2 |
| 2008/0222290 | A1* | 9/2008 | Le Moigne | H04L 63/101 709/226 |
| 2009/0080375 | A1* | 3/2009 | Jalil | H04W 24/02 370/329 |
| 2009/0168645 | A1* | 7/2009 | Tester et al. | 370/225 |
| 2009/0185486 | A1* | 7/2009 | Gerber | H04L 12/2602 370/234 |
| 2009/0191858 | A1* | 7/2009 | Calisti | H04L 12/5695 455/422.1 |
| 2009/0193126 | A1* | 7/2009 | Agarwal | H04L 29/08846 709/228 |
| 2009/0251529 | A1* | 10/2009 | Tucker | H04L 12/1827 348/14.09 |
| 2009/0254968 | A1* | 10/2009 | Bussani | G06F 21/31 726/1 |
| 2009/0328219 | A1* | 12/2009 | Narayanaswamy | H04L 63/1425 726/23 |
| 2010/0115586 | A1* | 5/2010 | Raghavan et al. | 726/3 |
| 2010/0144334 | A1* | 6/2010 | Gorokhov | H04L 5/0035 455/418 |
| 2010/0157838 | A1* | 6/2010 | Vaswani et al. | 370/252 |
| 2010/0228862 | A1* | 9/2010 | Myers | H04L 65/1069 709/227 |
| 2011/0199962 | A1* | 8/2011 | Kahn | H04L 12/5692 370/328 |
| 2011/0202646 | A1* | 8/2011 | Bhatia | H04L 67/06 709/223 |
| 2011/0211567 | A1* | 9/2011 | Chai | H04L 67/125 370/338 |
| 2011/0222520 | A1* | 9/2011 | Montemurro | H04W 74/006 370/338 |
| 2012/0016960 | A1* | 1/2012 | Gelb | H04N 7/147 709/217 |
| 2012/0042075 | A1* | 2/2012 | Goetz | G06F 9/5072 709/226 |
| 2012/0133731 | A1* | 5/2012 | Lin | H04N 13/0051 348/42 |
| 2012/0151056 | A1* | 6/2012 | Sporel | H04L 45/02 709/225 |
| 2012/0196644 | A1* | 8/2012 | Scherzer | H04W 72/02 455/524 |
| 2012/0278851 | A1* | 11/2012 | Dan | H04L 41/0893 726/1 |
| 2013/0040703 | A1* | 2/2013 | Raleigh | G06Q 10/06375 455/557 |
| 2014/0140213 | A1* | 5/2014 | Raleigh | H04L 67/2804 370/235 |

* cited by examiner

NETWORK SERVICE ADMISSION CONTROL USING DYNAMIC NETWORK TOPOLOGY AND CAPACITY UPDATES

BACKGROUND

Networks typically include multiple network elements (e.g., routers) that carry and/or switch network traffic from a source to a destination. In some networks, policy management devices are used to limit access to resources of the network based on the application of policies that are based on a statically provisioned representation of the network topology. These policy manager devices, therefore, deny or grant access to resources of the network using policies that do not take into account changing conditions in the delivery of network services, such as, for example, changes in network topology and/or network capacity.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, a policy manager may be implemented that uses notifications of changes in network topology and/or network capacity as dynamic feedback to the application of policies for denying or granting access to resources in a network. Various network elements in a network may send messages that notify the policy manager of events that relate to changes in network topology or capacity (e.g., node failures, link failures, etc.). The policy manager may use the event notification information contained in the received messages to identify changes in network topology or capacity, and to revise a view (e.g., a network map) of the topology and capacity of the network. The policy manager may subsequently use this dynamically modified view of the network in selecting policies for resource admission control and for granting or denying the delivery of a network service (e.g., video on demand) to a requesting customer device.

Figure 1:
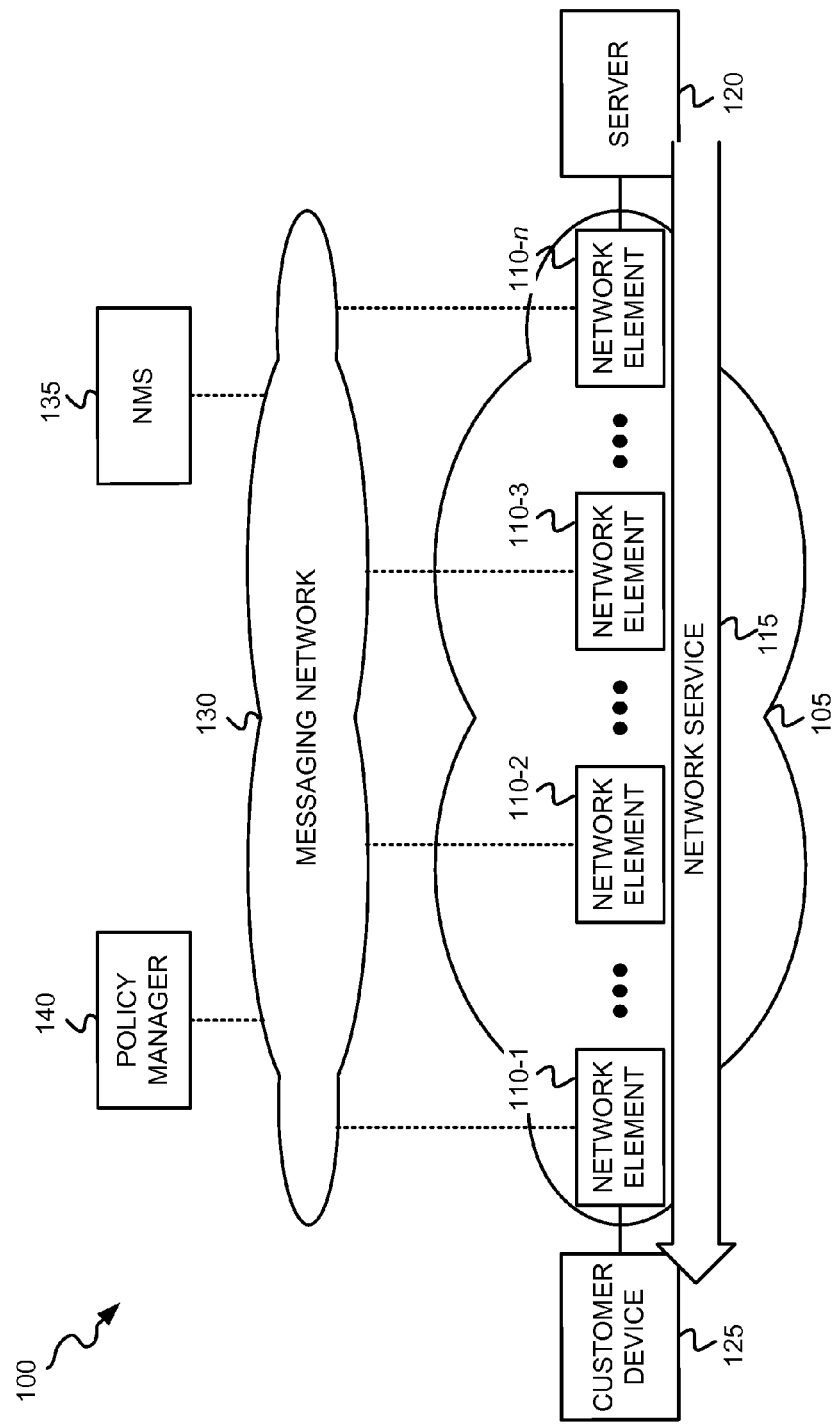
FIG. 1 is a diagram that depicts an exemplary network environment in which a service delivery network uses multiple network elements to deliver a network service from a server to a customer device.

FIG. 1 is a diagram that depicts an exemplary network environment 100 in which a service delivery network 105 uses multiple network elements 110-1 through 110-n to deliver a network service 115 from a server 120 to a customer device 125. As further shown in FIG. 1, network environment 100 may also include a messaging network 130 that may be connect with selected ones of network elements 110-1 through 110-n and may also connect with Network Management System (NMS) 135 and policy manager 140. FIG. 1 depicts all of network elements 110-1 through 110-n connected with messaging network 130 for illustrative purposes. In other implementations, only selected ones of network elements 110-1 through 110-n may connect with messaging network 130.

Customer device 125 may include any type of electronic customer device that may receive a network service. Customer device 125 may include, for example, include a laptop, palmtop or tablet computer, a cellular telephone (e.g., smart phone), a personal digital assistant (PDA), a set top box (STB), or a RVU server or RVU client in an RVU system. Network environment 100 is shown in FIG. 1 as including a single customer device 125. Multiple customer devices (not shown) may, however, connect to network 105 to receive a network service from server 120.

Service delivery network 105 may include any type of network that includes one or more network elements that assist in the delivery of a network service between server 120 and customer device 125. Network 105 may include a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, the Internet, or a cable network (e.g., an optical cable network). Network elements 110-1 through 110-n of network 105 may include any type of network element involved in the delivery of a network service between two endpoints in network 105. Network elements 110-1 through 110-n may each include, for example, a router, a bridge, a gateway, a data switching element, etc. The network service may include any type of network service including, but not limited to, a video on demand (VOD) network service.

Server 120 may include a network device that delivers a network service to customer device 125 via network elements 110-1 through 110-n of network 105. In one implementation, the network service may include a VoD service, and server 120 may include a VoD server 120 that delivers video to customer device 125 via network elements 110-1 through 110-n based on a demand delivery request received from customer device 125.

Messaging network 130 may include any type of network that may receive event notification messages from network elements 110-1 through 110-n of network 105 and deliver them to NMS 135. Messaging network 130 may carry messages between NMS 135 and policy manager 140, and between policy manager 140 and network elements 110-1 through 110-n. In one exemplary embodiment, messaging network 130 may include a network that is independent of network 105 such that any failure of components of network 105 does not affect the communication of messages via messaging network 130.

NMS 135 may include a network device that implements functionality for monitoring and administering network 105. NMS 135 may receive event notifications, that carry data specifying events that affect the network topology or capacity of network 105, from network elements 110-1 through 110-*n*, or from other network devices associated with network 105. The event notifications may include Simple Network Management Protocol (SNMP) traps that are "pushed" asynchronously from a network element 110 to NMS 135 when a specific event occurs that affects the network topology or capacity of network 105. The event notifications may also include SNMP responses sent in response to polling by NMS 135. The event notifications may, for example, carry data related to parameters that are external to network 105. Such parameters may include environmental parameters such as, for example, temperature, humidity, pressure, weather patterns affecting network 105 (e.g., a hurricane, a tropical storm), geological activity affecting network 105 (e.g., an earthquake), or man-made conditions affecting network 105 (e.g., attacks, fires, etc.). Other types of event notifications, other than SNMP traps, may be used to notify policy manager 140 of changes to the network topology or capacity of network 105.

Policy manager 140 may include a network device, or a software or hardware implemented portion of a network device, that may receive event notification messages from NMS 135 and may use the content of those messages to analyze network 105 to identify changes in network topology or capacity. Policy manager 140 may additionally use the identified changes in network topology or capacity to perform admission control to network 105 using policies stored at policy manager 140. In some embodiments, policy manager 140 may change to a different set of policies, based on the identified changes in network topology or capacity when applying admission control to service requests from customer device 125. In other embodiments, policy manager 140 may only update the available network bandwidth based on the identified changes in network topology or capacity and may apply admission control to service requests based on the updated available network bandwidth. In further embodiments, policy manager 140 may use updated available network bandwidth, and a change to a different set of policies, to apply admission control to service requests from customer device 125.

The configuration of network components of network environment 100 illustrated in FIG. 1 is for illustrative purposes only. Other configurations may be implemented. Therefore, network environment 100 may include additional, fewer and/or different components than those depicted in FIG. 1.

Figure 2:
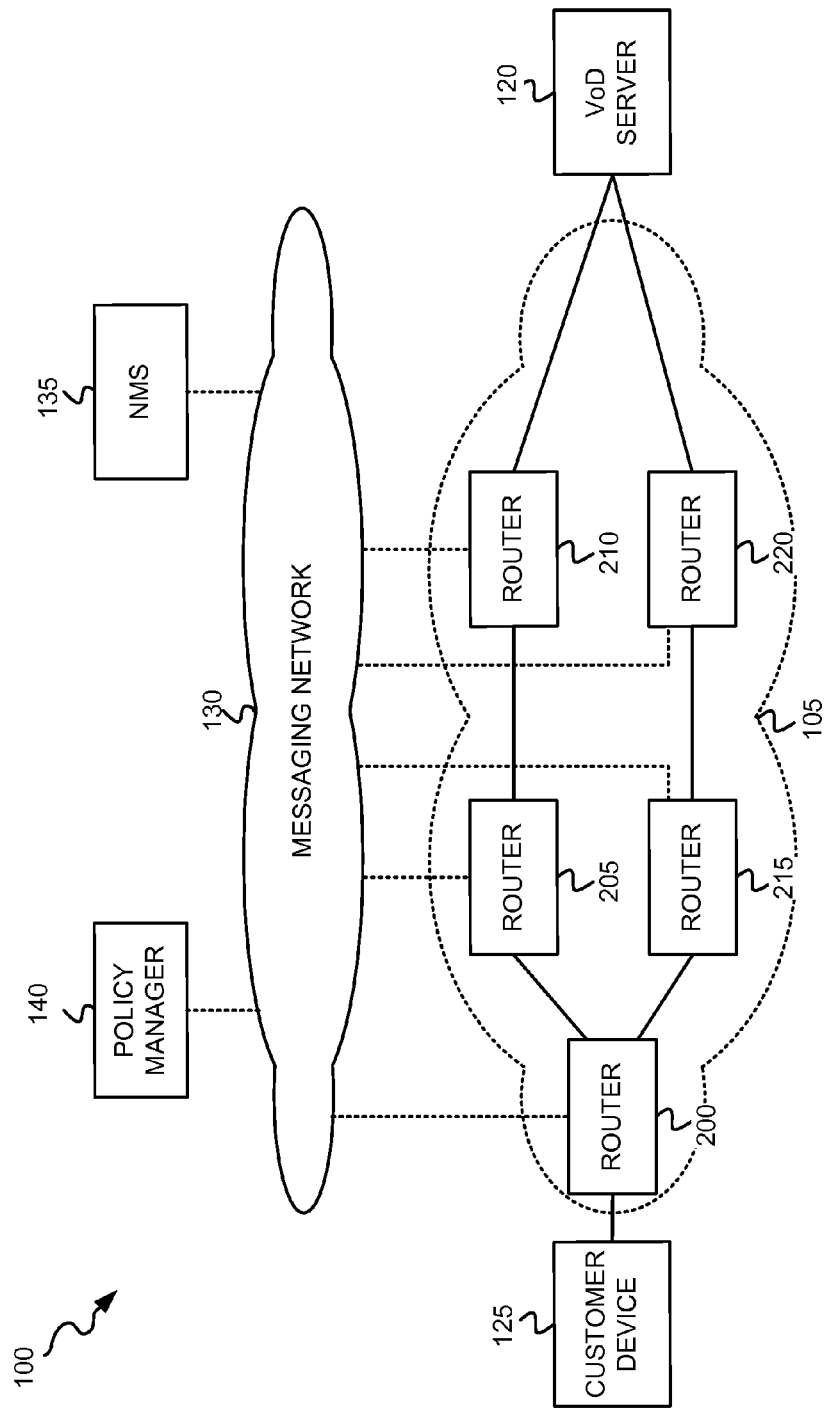
FIG. 2 is a diagram of an example of the network environment of FIG. 1 in which the service delivery network includes a video on demand network that delivers video on-demand from the video on-demand server to the customer device.

FIG. 2 is a diagram of an example of network environment 100 of FIG. 1, where service delivery network 105 includes a video on demand (VoD) network that delivers video on demand from VoD server 120 to customer device 125. As shown in FIG. 2, VoD network 105 may include multiple routers 200, 205, 210, 215 and 220, with router 200 representing an entrance point from customer device 125 to VoD network 105, routers 205 and 210 representing one branch for service delivery via VoD network 105, and routers 215 and 220 representing a second branch for service delivery via VoD network 105.

In the exemplary network environment 100 of FIG. 2, VoD server 120 may deliver video on-demand to customer device via either the branch that includes routers 205 and 210, or via the branch that includes routers 215 and 220. In one exemplary implementation, the branch including routers 205 and 210 may be capable of carrying 10 Gigabits per second (Gbps), and the branch including routers 215 and 220 may also be capable of carrying 10 Gbps. Therefore, assuming that both branches are operating at full capacity, then VoD server 120 may send 20 Gbps of video data to customer device 125 across network 105.

As shown in FIG. 2, each of routers 200, 205, 210, 215 and 220 may connect to messaging network 130 such that each of the routers may send event notifications to NMS 135 which, in turn, may forward the event notifications on to policy manager 140. The event notifications may include information related to changes in network topology and/or capacity noted at each of routers 200, 205, 210, 215 and 220. For example, an event notification from one of routers 200, 205, 210, 215 or 220 may include data identifying a loss of bandwidth along one of the branches. As another example, an event notification from one of the routers may include data identifying the removal of a specific link, or a specific router, thus, indicating a change in network topology.

The configuration of components of VoD delivery network 105 illustrated in FIG. 2 is for illustrative purposes only. Other configurations may be implemented. Therefore, VoD network 105 may include additional, fewer and/or different components than those depicted in FIG. 2.

Figure 3:
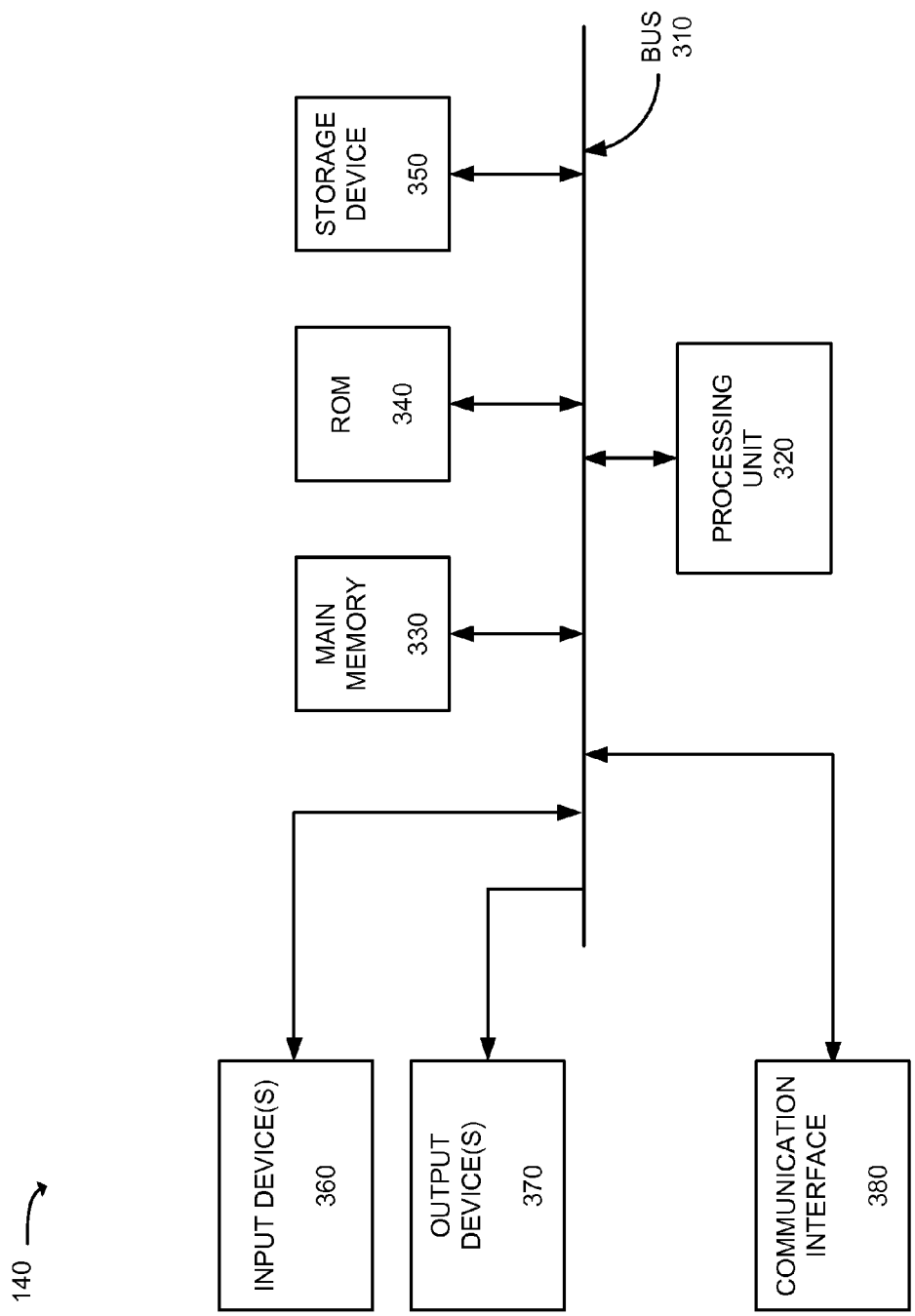
FIG. 3 is a diagram that depicts exemplary components of the policy manager of FIG. 1.

FIG. 3 is a diagram that depicts exemplary components of policy manager 140. NMS 135, server 120 and customer device 125 may be similarly configured. Policy manager 140 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of server 220.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium.

Input device 360 may include one or more mechanisms that permit an operator to input information to server 220, such as, for example, a keypad or a keyboard, voice recognition and/or biometric mechanisms, etc. Output device 370 may include one or more mechanisms that output information to the operator, including a display, a speaker, etc. Communication interface 380 may include any transceiver mechanism that enables policy manager 140 to communicate with other devices and/or systems. For example, communication interface 380 may include mechanisms for communicating with NMS 135 and network elements 110-1 through 110-*n* via messaging network 130.

Policy manager 140 may perform certain operations or processes, as described herein. Policy manager 140 may perform these operations in response to processing unit 320 (or multiple processing units—not shown) executing software instructions contained in a computer-readable medium, such as memory 330. A computer-readable medium may include a physical or logical memory device. A logical memory device may include memory space within a single physical memory device or spread across multiple physical memory devices.

The software instructions may be read into main memory 330 from another computer-readable medium, such as storage device 350, or from another device via communication interface 380. The software instructions contained in main memory 330 may cause processing unit 320 to perform operations or processes that are described below. Alternatively, hardwired circuitry may be used in place of or in combination with software instructions to implement processes described herein. Thus, exemplary implementations are not limited to any specific combination of hardware circuitry and software.

The configuration of components of policy manager 140 illustrated in FIG. 3 is for illustrative purposes only. Other configurations may be implemented. Therefore, policy manager 140 may include additional, fewer and/or different components than those depicted in FIG. 3.

Figure 4:
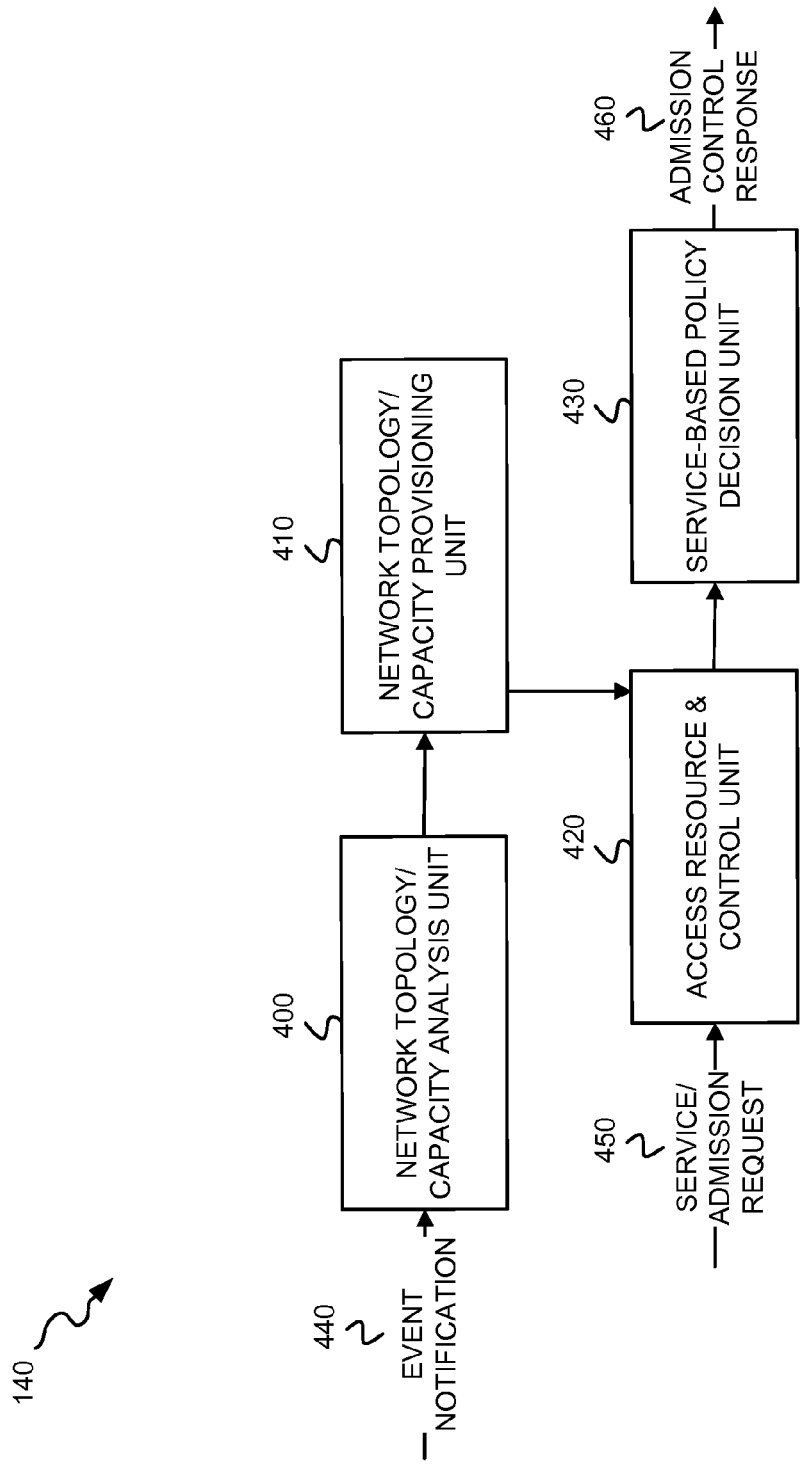
FIG. 4 is a diagram that illustrates exemplary functional components of the policy manager of FIG. 1.

FIG. 4 is a diagram that illustrates exemplary functional components of policy manager 140. The functional components of policy manager 140 may include a network topology/capacity analysis unit 400, a network topology/capacity provisioning unit 410, an access resource and control unit 420, and a service-based policy decision unit 430. The functional components of policy manager 140 may be implemented by processing unit 320, possibly in conjunction with memory 330, ROM 340, and/or storage device 350.

Network topology/capacity analysis unit 400 may receive event notifications 440 from NMS 135 that originated from one or more of network elements 110-1 through 110-n and may extract data specifying an event associated with a change in network topology or capacity that occurred at or in the vicinity of the one or more network elements. Unit 400 may analyze the extracted data to determine whether the specified event changes the topology of network 105, or changes the capacity of network 105. If unit 400 determines that the specified event has changed the topology of network 105, unit 400 may send an indication of such a change to network topology/capacity provisioning unit 410. If unit 400 determines that the specified event has changed the capacity of network 105, then unit 400 may send an indication of the change in capacity to network topology/capacity provisioning unit 410.

Network topology/capacity provisioning function 410 may receive information from unit 400 that identifies specific changes in network topology or capacity of network 105 as determined by unit 400. The identified changes in network topology may include, for example, the removal or addition or links and/or nodes (e.g., network elements) in network 105, with a corresponding change in overall network topology. The identified changes in capacity may include, for example, an identification of increases or decreases in bandwidth capacity along specific links or branches of network 105. The identified changes to the network capacity may include partial or complete network element failures. For example, a router blade may fail thereby causing the loss of half of the available bandwidth. Failure of the router blade, therefore, constitutes a partial network element failure that does, however, affect the network capacity. Unit 410 may supply data to access resource and control unit 420 to select different sets of policies to be applied to admission requests, based on the identified changes in network topology or capacity, from customer device 125, server 120 and/or network element 110. Additionally, unit 400 may supply data to unit 420 to select modified bandwidth constraints to be applied to admission requests from customer device 125, server 120 and/or network element 110.

Access resource and control unit 420 may receive service/admission requests 450 from customer device 125, server 120 and/or a network element 110, and may select a set of policies and capacity constraints based on data received from unit 410. Unit 420 may identify the selected set of policies and capacity constraints to service-based policy decision unit 430. Service-based policy decision unit 430 may apply the selected set of policies and capacity constraints in deciding whether to approve the service/admission request 450 from customer device 125, server 120 or network element 110. Unit 430 may return an admission control response 460 to customer device 125, server 120 and/or network element 110 (i.e., depending on which entity originated a request for network service delivery) that either approves or denies the request for admission/service.

The configuration of functional components of policy manager 140 illustrated in FIG. 4 is for illustrative purposes only. Other configurations may be implemented. Therefore, policy manager 140 may include additional, fewer and/or different functional components than those depicted in FIG. 4.

Figure 5:
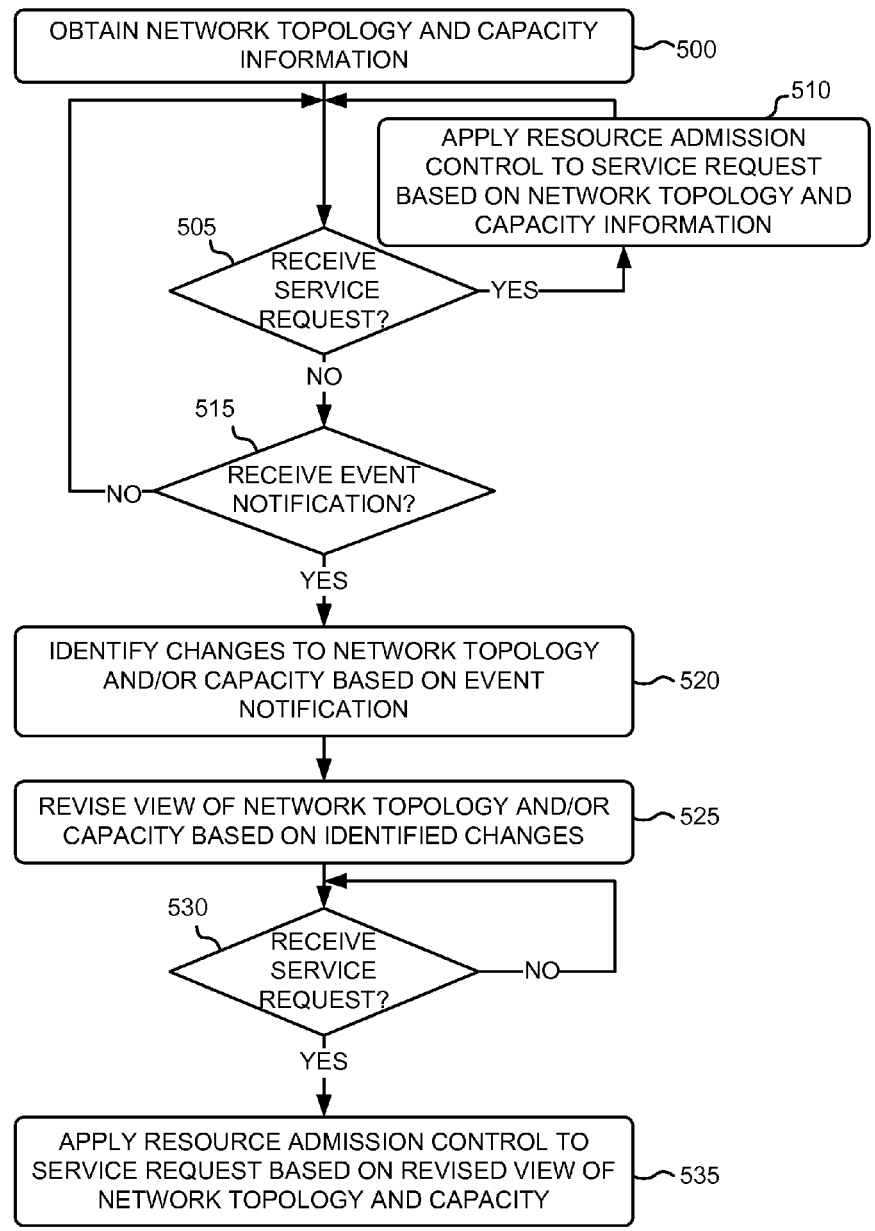
FIG. 5 is a flow diagram that illustrates an exemplary process for applying resource admission control to requests for delivery of network services from customer devices based on feedback involving network topology and capacity changes received from network elements involved in delivering the network service to the customer devices.

FIG. 5 is a flow diagram that illustrates an exemplary process for applying resource admission control to requests for delivery of network services from customer devices based on feedback involving network topology and capacity changes received from network elements involved in delivering the network service to the customer devices. The exemplary process of FIG. 5 may be implemented by policy manager 140. The description of the exemplary process of FIG. 5 below may refer to the exemplary messaging diagram of FIG. 6, and the example of FIG. 7.

The exemplary process may include obtaining network topology and capacity information associated with network 105 (block 500). Network topology capacity analysis unit 400 of policy manager 140 may initially receive network topology and capacity information via a manual process by which a network operator may input the information into policy manager 140. The network topology and capacity information may include an identification of network elements in network 105, the number and type of links that interconnect each network element and the manner in which the various network elements are interconnected, and the bandwidth capacity of each network element and each interconnecting link Alternatively, network topology capacity analysis unit 400 of policy manager 140 may receive network topology and capacity information via an automated provisioning process.

Figure 6:
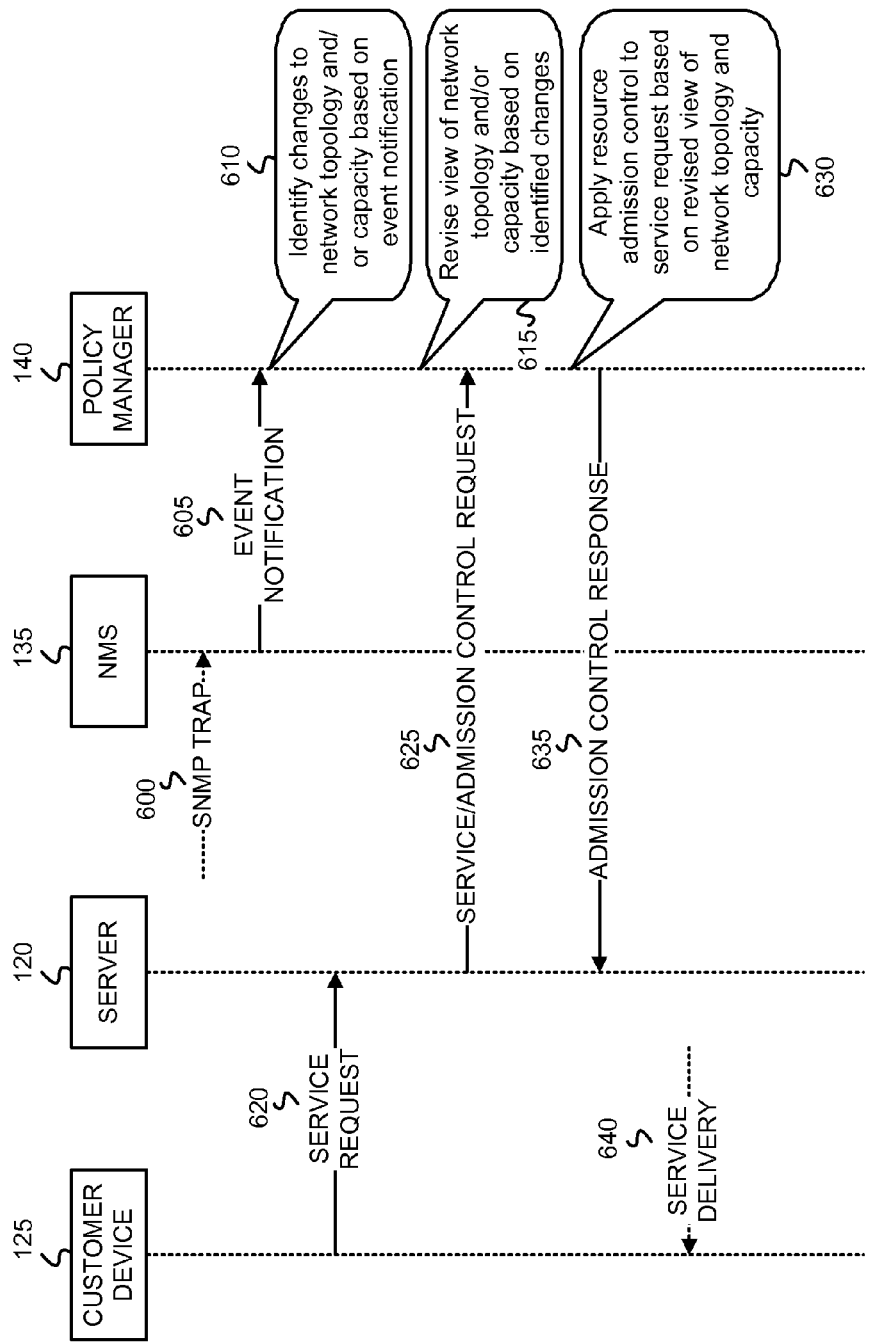
FIG. 6 is a diagram that illustrates an exemplary messaging diagram associated with the exemplary process of FIG. 5.

Policy manager 140 may determine if a service request is received (block 505). Customer device 125 may send a service request for delivery of a network service to server 120 via the network element that serves as the entry point into network 105. For example, in the example network of FIG. 2, customer device 125 may send a service request to server 120 via router 200. Server 120, or the network element that serves as the entry point into network 105 (e.g., router 200), may send a corresponding service/admission request to policy manager 140. The messaging diagram of FIG. 6 depicts customer device 125 sending a service request 620 to server 120. If a service request is received (YES—block 505), policy manager 140 may apply resource admission control to the service request based on the network topology and capacity information obtained in block 500 (block 510). Policy manager 140 may, therefore, apply resource admission control policies to denying or granting the service/admission request based on the originally obtained, unchanged network topology and capacity information.

Figure 7:
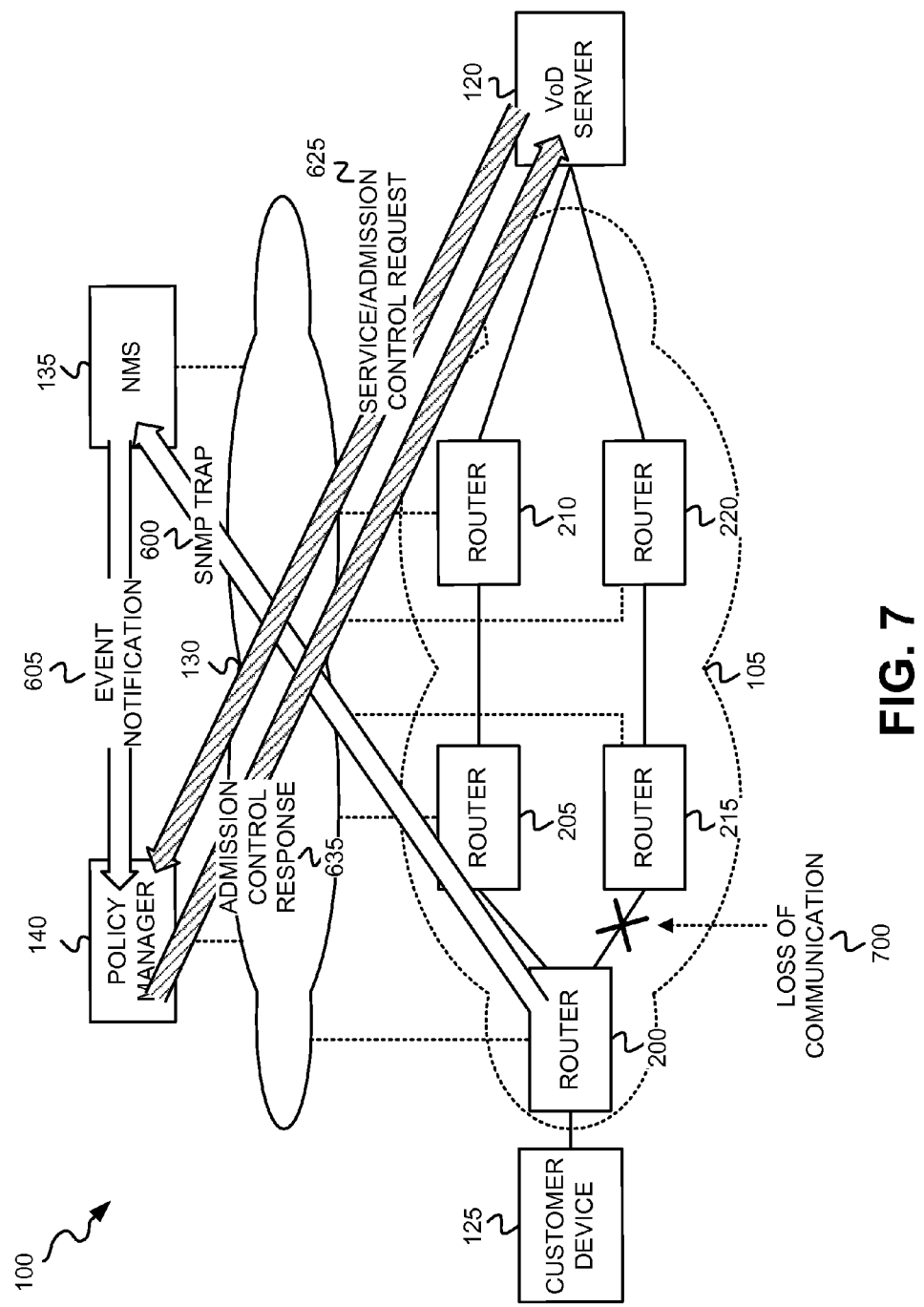
FIG. 7 is a diagram that illustrates an example of network service admission control using dynamic network topology and capacity updates being applied in the exemplary network environment of FIG. 2.

If a service request is not received (NO—block 505), policy manager 140 may determine if an event notification is received (block 515). If not, then the exemplary process may return to block 505. If an event notification is received (YES—block 515), policy manager 140 may identify changes to the network topology and/or capacity based on the received event notification (block 520). The identified changes to the network topology may include the identification of failures of specific network elements and/or links. The identified changes to the network capacity may include the identification of increases or reductions in capacity of specific network elements and/or links. The identified changes to the network capacity may also include partial or complete network element failures. For example, a router blade may fail thereby causing the loss of half of the available bandwidth. Failure of the router blade, therefore, constitutes a partial network element failure that does, however, affect the network capacity. The messaging diagram of FIG. 6 depicts a SNMP trap 600 being sent to NMS 135 (e.g., from router 200 in FIG. 7), where SNMP trap 600 includes data related to a change in network topology or capacity in network 105. FIG. 7 further graphically depicts SNMP trap 600 being sent across messaging network 130 to NMS 135 from router 200 in network environment 100 in response to a loss of communication 700 occurring on the link between router 200 and router 215. Upon receipt of SNMP trap 600, NMS 135 forwards, as shown in FIG. 6, an event notification 605 to policy manager that includes the data related to a change in network topology or capacity in network 105. As further shown in FIG. 6, policy manager 140, upon receipt of event notification 605, identifies 610 changes to the network topology and/or capacity of network 105 based on event notification 605. FIG. 7 further graphically depicts NMS 135 sending event notification 605 to policy manager 140 in network environment 100.

Policy manager 140 may revise its view of the network topology and/or capacity based on the changes identified in block 520 (block 525). Revising the view of the network topology of network 105 may include changing the number and configuration of network elements in network 105 or changing the interconnection of links among the network elements. Revising the view of the network topology of network 105 may further include identifying certain network elements and/or links as having partially or completely failed. Revising the view of the network may, thus, result in a modified map of nodes and interconnecting of network 105. Revising the view of the capacity of network 105 may include identifying changes in capacity (e.g., bandwidth capacity) of selected network elements or selected links in network 105. Such changes may include, for example, a reduction or increase in bandwidth capacity of a given network element or link.

The messaging diagram of FIG. 6 depicts policy manager 140 revising 615 its view of the network topology and/or capacity of network 105 based on the changes identified in block 520. When revising its view of the network topology and/or capacity of network 105, policy manager 140 may additionally select a different set of policies for applying subsequent resource admission control to resources (e.g., bandwidth) of network 105. For example, a first set of policies may be utilized under a certain set of network conditions (i.e., a certain configuration of network elements and links), and a second set of policies may be selected under another set of network conditions (e.g., a failure in certain network elements or links). As a specific example, policy manager 140, upon revising its view of the network capacity to reflect that a given link has failed, resulting in a decrease of available bandwidth for delivering the network service from server 120, may change to a set of policies that reject requests for free video content delivery from server 120, but grant requests for video content for which customers are paying (i.e., "pay" video on demand).

Policy manager 140 may determine if a service request has been received (block 530). Customer device 125 may send a service request for delivery of a network service to server 120 via the network element that serves as the entry point into network 105. For example, in the example network of FIG. 2, customer device 125 may send a service request to server 120 via router 200. Server 120, or the network element that serves as the entry point into network 105 (e.g., router 200), may send a corresponding service/admission request to policy manager 140. Referring to the exemplary messaging diagram of FIG. 6, customer device 125 is depicted as sending a service request 620 to server 120 and, in turn, server 120 forwards a service/admission control request 625 to policy manager 140. FIG. 7 further graphically depicts server 120 sending service/admission control request 625 to policy manager 140.

If a service request has been received (YES—block 530), then policy manager 140 may apply resource admission control to the service request based on the revised view of the network topology and capacity (block 535). Policy manager 140 may apply resource admission policies selected in block 525 for denying or granting customer device 125 access to network 105, and for permitting or denying delivery of the network service from server 120. The messaging diagram of FIG. 6 depicts policy manager 140, subsequent to receipt of service/admission control request 625, applying 630 resource admission control to service request 620 based on the revised view of the network topology and/or capacity of network 105. As further shown in FIG. 6, policy manager 140 may send an admission control response 635 to server 120 that denies or grants admission to resources of network 105. If admission control response 635 includes a grant of access to network 105, delivery 640 of the network service from server 120 to customer device 125 may begin. FIG. 6 further graphically shows admission control response 635 being sent from policy manager 140 to server 120 in the network environment 100. In the example network 105 shown in FIG. 7, VoD server 120 may begin delivery of the requested video across network 105 to customer device 125.

Exemplary embodiments described herein implement a policy manager that may use a dynamically modified view of the topology and capacity of a network to apply resource admission control policies to requests for network service delivery in the network. The policy manager may use event notification information contained in messages received from network elements in the network to identify changes in network topology or capacity, to revise a view of the topology and capacity of the network, and to use the dynamically modified view in selecting policies for resource admission control and for granting or denying the delivery of the network service to a requesting customer device.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIG. 5, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    selecting, at a central policy management device, a first set of resource admission control policies;
    receiving, at the central policy management device from a network service delivery device via a messaging network, a first request for delivering first data associated with a network service from the network service delivery device to a first customer device across a service delivery network, wherein the messaging network is different than the service delivery network;
    applying resource admission control, at the central policy management device, to selectively permit or deny delivery of the requested first data associated with the network service from the network service delivery device to the first customer device via the service delivery network based on the selected first set of resource admission control policies;
    sending a first admission control response, from the central policy management device to the network service delivery device, that indicates the selected permission or denial of the delivery of the first data associated with the network service to the first customer device;
    receiving, at the central policy management device via the messaging network, a notification related to a change in network topology or network capacity of the service delivery network;
    identifying, at the central policy management device, changes in the network topology or the network capacity of the service delivery network based on the notification;
    selecting, at the central policy management device, a second set of resource admission control policies based on the identified changes in the network topology or the network capacity of the service delivery network;
    receiving, at the central policy management device from the network service delivery device via the messaging network, a second request for delivering second data associated with the network service from the network service delivery device to a second customer device across the service delivery network;
    applying, at the central policy management device, the resource admission control to selectively permit or deny delivery of the requested second data associated with the network service from the network service delivery device to the second customer device via the service delivery network based on the selected second set of resource admission control policies; and
    sending a second admission control response, from the central policy management device to the network service delivery device, that indicates the selected permission or denial of the delivery of the second data associated with the network service to the second customer device.

2. The method of claim 1, wherein the notification originates from a network element in the service delivery network.

3. The method of claim 1, wherein the network service comprises a video on demand (VoD) service.

4. The method of claim 1, wherein the notification comprises data associated with a Simple Network Management Protocol (SNMP) trap received from a network element in the service delivery network.

5. The method of claim 1, wherein the change in network capacity of the service delivery network comprises a change in an available bandwidth in the service delivery network.

6. A policy management device, comprising:
    a communication interface connected to a messaging network and configured to receive, via the messaging network, a notification related to a change in network topology or network capacity of a service delivery network, wherein the service delivery network is different than the messaging network; and
    one or more processing units configured to:
        identify changes in the network topology or the network capacity of the service delivery network based on the notification,
        revise a view of the network topology or the network capacity of the service delivery network based on the identified changes,
        select either a first set of resource admission control policies or a second set of resource admission control policies based on the revised view of the network topology or the network capacity of the service delivery network, wherein the first set of resource admission control policies is different than the second set of resource admission control policies,
        receive, via the communication interface and the messaging network from a network service delivery device, a request for delivering first data associated with a network service from the network service delivery device to a first customer device across the service delivery network,
        apply resource admission control to selectively permit or deny delivery of the requested first data associated with the network service from the network service delivery device to the first customer device via the service delivery network based on the selected first or second set of resource admission control policies, and
        send a first admission control response, from the policy management device to the network service delivery device, that indicates the selected permission or denial of the delivery of the first data associated with the network service to the first customer device.

7. The policy management device of claim 6, wherein the notification originates from a network element in the service delivery network.

8. The policy management device of claim 6, wherein the network service comprises a video on demand (VoD) service.

9. The policy management device of claim 6, wherein the notification comprises data associated with a Simple Network Management Protocol (SNMP) trap received from a network element in the service delivery network.

10. The policy management device of claim 6, wherein the change in network capacity of the service delivery network comprises a change in an available bandwidth in the service delivery network.

11. A tangible non-transitory computer-readable medium containing instructions executable by at least one processor, the computer-readable medium comprising:
    one or more instructions for selecting, at a central policy management device, a first set of resource admission control policies;
    one or more instructions for receiving, at the central policy management device from a network service delivery device via a messaging network, a first request for delivering first data associated with a network service from the network service delivery device to a first customer device across a service delivery network, wherein the service delivery network is different than the messaging network;

one or more instructions for applying resource admission control, at the central policy management device, to selectively permit or deny delivery of the requested first data associated with the network service from the network service delivery device to the first customer device via the service delivery network based on the selected first set of admission control policies;

one or more instructions for sending a first admission control response, from the central policy management device to the network service delivery device, that indicates the selected permission or denial of the delivery of the first data associated with the network service to the first customer device;

one or more instructions for receiving, at the central policy management device via the messaging network, a notification related to a change in network topology or network capacity of the service delivery network, wherein the notification originates from a network element in the service delivery network;

one or more instructions for determining, at the central policy management device, a change in the network topology or the network capacity of the service delivery network based on the notification;

one or more instructions for selecting, at the central policy management device, a second set of resource admission control policies based on the determined change in the network topology or the network capacity of the service delivery network;

one or more instructions for receiving, at the central policy management device from the network service delivery device via the messaging network, a second request for delivering second data associated with the network service from the network service delivery device to a second customer device across the service delivery network; and one or more instructions for applying resource admission control, at the central policy management device, to selectively permit or deny delivery of the requested second data associated with the network service from the network service delivery device to the second customer device via the service delivery network based on the selected second set of resource admission control policies; and one or more instructions for sending a second admission control response, from the central policy management device to the network service delivery device, that indicates the selected permission or denial of the delivery of the second data associated with the network service to the second customer device.

12. The tangible non-transitory computer-readable medium of claim 11, wherein the network service comprises a video on demand (VoD) service.

13. The tangible non-transitory computer-readable medium of claim 11, wherein the notification comprises data associated with a Simple Network Management Protocol (SNMP) trap received from a network element in the service delivery network.

14. The tangible non-transitory computer-readable medium of claim 11, wherein the change in the network capacity of the service delivery network comprises a change in an available bandwidth in the service delivery network.

15. A method, comprising:
receiving, at a central policy management device via a messaging network, a notification related to a change in network topology or network capacity of a service delivery network;
identifying, by the central policy management device, a change in the network topology or the network capacity of the service delivery network based on the notification;
selecting, by the central policy management device, either a first set of resource admission control policies or a second set of resource admission control policies based on the identified change in the network topology or the network capacity of the service delivery network;
receiving, at the central policy management device from a network service delivery device via the messaging network, a request for delivering data associated with a network service from the network service delivery device to a customer device via the service delivery network, wherein the messaging network is different than the service delivery network;
applying, by the central policy management device, resource admission control to selectively permit or deny delivery of the requested data associated with the network service from the network service delivery device to the customer device based on the selected first or second set of resource admission control policies; and
sending an admission control response, from the central policy management device to the network service delivery device, that indicates the selected permission or denial of the delivery of the data associated with the network service to the customer device.

16. The method of claim 15, wherein the notification originates from a network element in the service delivery network.

17. The method of claim 15, wherein the network service comprises a video on demand (VoD) service.

18. The method of claim 15, wherein the notification comprises data associated with a Simple Network Management Protocol (SNMP) trap received from a network element in the service delivery network.

19. The method of claim 15, wherein the change in the network capacity of the service delivery network comprises a change in an available bandwidth in the service delivery network.

* * * * *